UNITED STATES PATENT OFFICE.

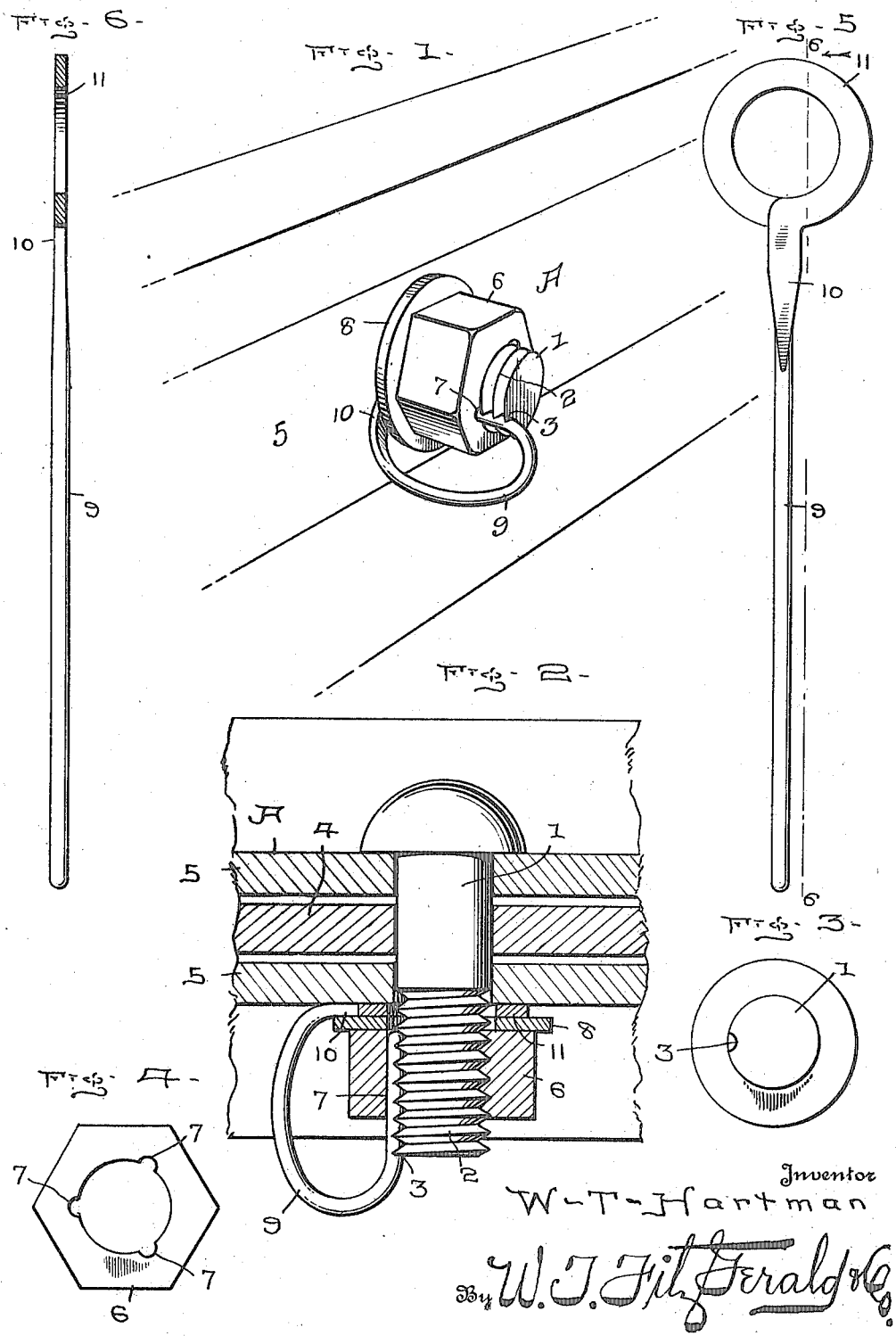

WILLIAM T. HARTMAN, OF LOCKHART, FLORIDA.

NUT-LOCK.

1,264,395.

Specification of Letters Patent. Patented Apr. 30, 1918.

Application filed December 14, 1916. Serial No. 137,039.

*To all whom it may concern:*

Be it known that I, WILLIAM T. HARTMAN, a citizen of the United States, residing at Lockhart, in the county of Orange and State of Florida, have invented certain new and useful Improvements in Nut-Locks; and I do hereby declare the following to be a full, clear, and exact description of the invention, such as will enable others skilled in the art to which it appertains to make and use the same.

This invention relates to nut locks designed for use primarily in connection with railway joints.

The prime object of the invention is the provision of a nut lock of the above stated character which will be of cheap and inexpensive construction, of durable and substantial design, and one which may be readily and quickly manipulated.

Another object of the invention is the formation of the bolt shank with a longitudinally extending recess, the nut with a plurality of transversely extending recesses and adapted to selectively aline with the recesses of the bolt, and a locking wire having one end coiled to provide a loop designed to be positioned over the bolt shank, and behind the nut threadedly connected thereto, the free end of the locking wire being bent around the nut and inserted into the alining recesses of the nut and bolt shank to hold and retain the nut in adjusted position.

With these and other objects in view as will appear as the description proceeds, the invention comprises the novel features of construction, combination and arrangement of parts as will be more fully described hereinafter and set forth with particularity in the appended claims.

Referring to the drawings,

Figure 1 is a perspective view of a fragmentary portion of a railway joint showing the application of my improved nut lock thereto.

Fig. 2 is a horizontal section through the rail joint, showing my improved nut lock and its coöperating parts arranged in adjusted position.

Fig. 3 is an end elevation of the bolt.

Fig. 4 is an end elevation of the nut therefor.

Fig. 5 is a detail elevation of my improved locking wire, and

Fig. 6 is a vertical transverse sectional view on the line 6—6 of Fig. 5.

Similar characters of reference are used to denote like parts throughout the accompanying drawings and the following description.

Referring more particularly to the drawings, the letter "A" represents a fragmentary portion of an ordinary railway joint which is coupled together through the medium of my improved railway joint bolts. Each of these bolts, as clearly shown, is provided with a headed shank 1, which has its outer end threaded, as indicated at 2, and is provided with a semicircular, or other shaped recess 3, that extends longitudinally of the shank from its outer free end toward its head.

As clearly shown in Fig. 2 of the drawings, the shank of the bolt 1 is extended through the web 4 and the fish plates 5 of the rail joint, and has threadedly connected to its outer end a nut 6, which is provided with a plurality of transversely extending recesses 7, similar in shape and design to that of the bolt shank, and which communicate with the opening of the nut. These recesses 7 are designed to selectively aline with the recess of the bolt shank and are designed to receive a locking pin, which will presently be described, in order to prevent the nut from revolving upon the bolt shank. Positioned behind the nut 6 is a washer 8, which may or may not be used as desired.

In order to lock the nut against rotation, I employ a novel form of locking wire 9 which is shown to be flattened at one end, as indicated at 10, and is then coiled to form a circular loop 11, which is designed to be positioned over the shank of the bolt between the washer 8 and the adjacent fish plate 5 of the rail joint. The free end of this locking wire 9 is bent around the nut 6 and has its end inserted into the opening formed by the alining recesses of the nut and the bolt shank, and when in this position, will prevent the nut from rotating upon the bolt shank. As shown, the nut is provided with three semi-circular recesses, but I desire to have it understood that this nut may be provided with any number of recesses in order that as fine an adjustment of the nut on the shank may be had, as desired.

When it is desired to remove the nut from the bolt or readjust the same, it is only necessary to grasp the free end of the locking wire and remove the same from the alining recesses of the nut and the bolt shank, whereupon the nut may be freely rotated as desired.

I claim:—

1. The combination with a rail joint, of a headed bolt having a threaded shank extended through said joint and formed with a longitudinally extending recess, a nut threadedly connected with said shank and formed with a transversely extending recess adapted to aline with the shank recess, a washer positioned on said shank behind said nut, and a locking wire having one end coiled to form a loop and positioned on said shank between the washer and the rail joint, the outer free end of said locking wire being bent around the nut and inserted into the opening formed by the alining recesses of the nut and shank.

2. In a nut lock, the combination of a bolt having a recess formed longitudinally thereof, a nut threadedly connected to said bolt and provided with a plurality of transversely extending recesses communicating with the opening thereof and adapted to selectively aline with the recess of the bolt, a washer mounted upon the bolt behind said nut, and a locking wire having one end flattened and coiled to provide a loop designed to be positioned over the bolt behind said washer, the outer free end of said wire adapted to be bent around the nut and then inserted into the opening formed by the alining recesses of the nut and bolt to prevent rotation of the nut with respect to the bolt.

In testimony whereof I have signed my name to this specification in the presence of two subscribing witnesses.

WILLIAM T. HARTMAN.

Witnesses:
A. N. GOODWIN,
WM. REINAU.

Copies of this patent may be obtained for five cents each, by addressing the "Commissioner of Patents, Washington, D. C."